March 20, 1973  C. J. GREEN  3,721,102

COOL WORKING GAS GENERATOR

Filed Dec. 4, 1969

INVENTOR
CHARLES J. GREEN
BY
Graybeal, Cole & Barnard
ATTORNEYS

United States Patent Office 3,721,102
Patented Mar. 20, 1973

3,721,102
COOL WORKING GAS GENERATOR
Charles J. Green, Vashon Island, Wash., assignor to Rocket Research Corporation, Redmond, Wash.
Filed Dec. 4, 1969, Ser. No. 882,221
The portion of the term of the patent subsequent to Mar. 11, 1986, has been disclaimed
Int. Cl. F17c 11/00
U.S. Cl. 62—48
16 Claims

ABSTRACT OF THE DISCLOSURE

Hot pressure gases are generated by burning a solid fuel grain. A portion of the gases are used to pressure feed a liquid from its storage chamber into a mixing zone. The remainder of the hot gases are directed into the mixing zone for mixing therein with the liquid. The hot gases provide the heat of vaporization for, and cause the vaporization of, the liquid. The liquid may be liquefied ammonia gas or a liquefied ammonia gas and water mixture. The gas generator includes a removable control insert comprising metering passageways from the hot gases and the liquid and pressure burst discs. It also comprises a baffled mixing chamber.

BACKGROUND OF THE INVENTION

Field of the invention

The present invention relates primarily to the generation of a relatively low temperature working fluid, and in particular to the handling and combining of the substances which produce the working fluid.

Description of the prior art

Known gas generators which involve mixing combustion products and a coolant are disclosed by Goddard 2,522,113; Scholz 2,530,633; Maurice 2,779,281; Volk, Jr. 2,994,194; Barakauskas 3,182,544; and Barakauskas 3,298,278, and also by Hebenstreit 3,117,424; Hebenstreit et al. 3,122,181; Hebenstreit 3,143,445; Wismar 3,163,014; Hebenstreit 3,180,373; Hebenstreit 3,323,481; and Wismar 3,269,310.

Barakauskas 3,182,554 and Barakauskas 3,298,278 disclose adding water to combustion gases and then directing the resulting gas-water-steam mixture into a space below a missile for exerting a launching force on the missile.

Each of the latter group of patents involves a system wherein combustion products and the liquefied gas are mixed together in the storage chamber for the liquefied gas, and the resulting mixture, which is *gaseous*, is then released or withdrawn from such storage chamber.

Wismar 3,163,014 discloses a process comprising: generating hot combustion gases and initially directing *all* of such gases into a chamber containing liquefied carbon dioxide. Such chamber is initially closed by a blow out element. When the pressure in such chamber exceeds the burst pressure of the blow out element, such element is ruptured, and the outlet is opened. The remaining combustion gases then serve to aspirate the mixture of gases from the carbon dioxide storage chamber.

Hebenstreit et al. 3,122,181 discloses entraining ambient aid in a working fluid constituting a mixture of combustion gases and carbon dioxide, and then introducing the mixture into an inflatable device.

SUMMARY OF THE INVENTION

The present invention relates to a method and apparatus for rapidly removing a *liquid* from its storage chamber, and rapidly vaporizing such liquid substantially concurrently with its removal to produce a relatively cool gaseous working fluid, and particularly such a fluid that is suitable for use in inflating inflatable structures, such as aircraft escape slides, for example.

In practicing the invention hot gases under pressure are generated, such as by burning a fuel in a first confined zone; a portion of the resulting hot gases are introduced into a second confined zone, or storage chamber, containing a liquid, for pressure feeding the liquid into a third confined zone; the remainder of the hot gases are released into the third confined zone substantially concurrently with the liquid; the hot gases and liquid mix and the hot gases provide the heat of vaporization for, and cause the vaporization of, at least most of the liquid; the resulting mixture is formed into a stream; and such stream is delivered to a utilization device.

A principal feature of the present invention involves the use of liquefied ammonia gas or a mixture of liquefied ammonia gas and water as the vaporizable liquid. These substances are readily available in quantities as required. Ammonia has a low-boiling point, low viscosity and excellent thermal and chemical stability. Ammonia gas burns in admixture with air only within the limited range of 16–25% by volume of ammonia in air and when spark ignited. Ammonia can be stored under its own vapor pressure and can be shipped in bulk by rail or truck under established interstate commerce commission standards.

The present invention also relates to structural details of a particular form of cool gas generator, which are hereinafter described in detail.

DETAILED DESCRIPTION

Reference is made to my U.S. Pats. Nos. 3,431,742 and 3,431,743, both granted on Mar. 11, 1969, and both entitled, "Generation of Cool Working Fluids," and in particular to the inflation systems disclosed by such patents. The full disclosures of U.S. Pats. Nos. 3,431,742 and 3,431,743 are hereby expressly incorporated herein by this specific reference thereto.

Figure 1:
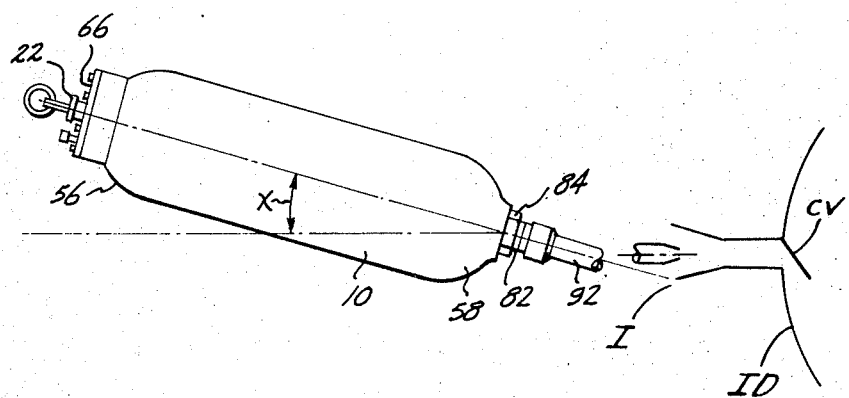
FIG. 1 is a side elevational view of a cool gas generator constructed according to the present invention, shown in the attitude it occupies in an inflation system.
Figure 2:
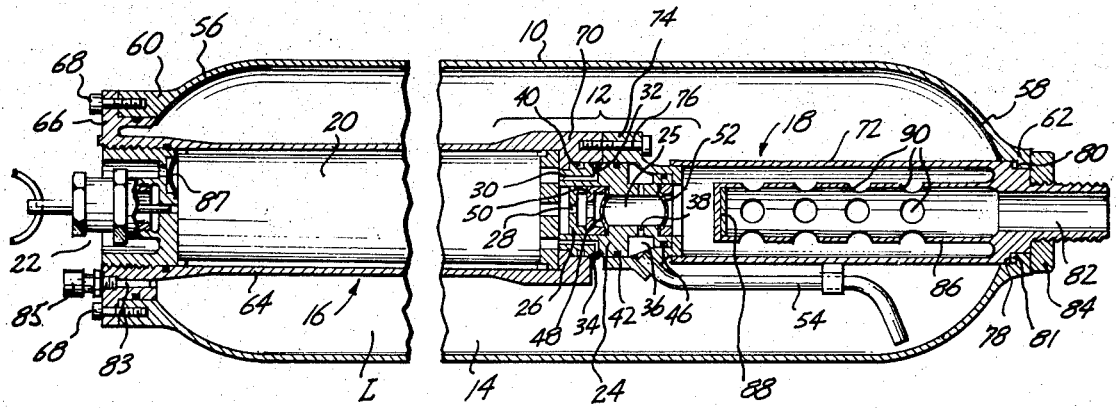
FIG. 2 is a longitudinal sectional view of the cool gas generator of FIG. 1, prior to activation.
Figure 3:
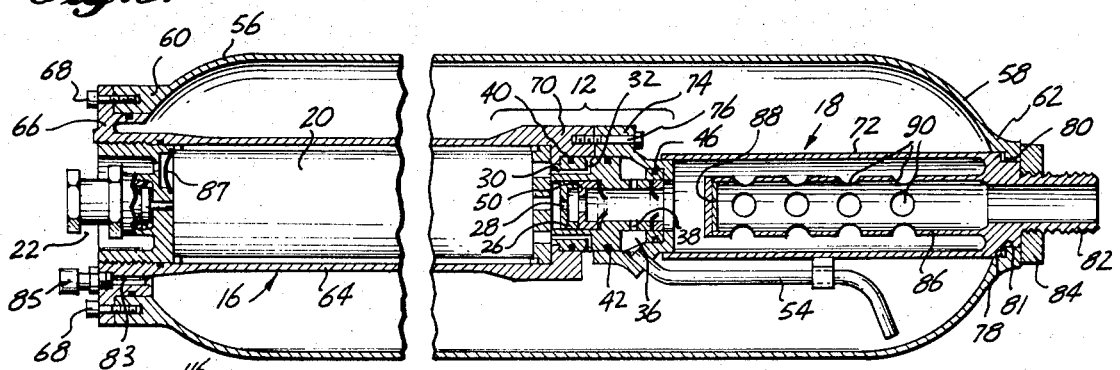
FIG. 3 is a view like FIG. 2, but showing the generator in an active condition.

Referring now to FIGS. 1–3 of the drawing, the cool gas generator is shown to comprise an outer enclosure or casing 10 of elongated tubular form. Located inside of enclosure 10 is a smaller inner tubular enclosure 12 of composite construction. An annular space 14 exits between the respective annular side wall means of the two enclosures 10, 12. This space 14 constitutes a storage space for the vaporizable liquid L.

The inner enclosure 12 is axially divided into a hot gas generator 16 and an outlet passageway 18. The hot gas generator 16 is shown to contain a solid fuel grain 20, and to include a percussion type firing mechanism 22. The fuel grain 20 may be constructed according to any of the designs of fuel grains disclosed in my aforementioned U.S. Pat. No. 3,431,742, with the particular construction in each case depending upon the intended use of the effluent of the particular system involved.

A control orifice insert 24 is supported between the hot gas generator 16 and the outlet passageway means 18. Insert 24 is shown to include an axial passageway 25 through which most of the hot gases flow. A transverse member 26 having a metering orifice 28 is located in the inlet portion of this axial passageway. A second hot gas passageway extends from the interior of the gas generator 16 into the liquid storage space 14. This passageway comprises one or more axial ports 30 offset radially outwardly from the primary passageway 25 and a radial port 32 associated with each passageway 30. A peripheral groove is formed in the insert where the outlets or ports 32 break the peripheral surface of the insert 24. An elastomeric O-ring 34 is initially seated in the groove to serve as a seal for preventing liquid from entering the gas generator 16 via the ports 32 and passageways 30.

A second peripheral channel or groove 36 is formed in the insert 24 downstream of the ports 32, and one or more radial ports 38 communicate the channel 36 with the central passageway 25. Sealing O-rings 40, 42, 46 are provided between the insert 24 and the cavity or socket for it in the wall means forming the inner casing 12. O-ring 40 is upstream of ports 32, O-ring 42 is downstream of ports 32 and upstream of channel 36, and O-ring 42 is downstream of channel 36.

A first burst disc 48 is held in place within the insert by a retainer 50 at a location downstream of orifice 28 and upstream of the ports 38. A second burst disc 52 is retained near the rear end of the insert, rearwardly of the orifices 38. A liquid pickup tube 54 extends from a pickup zone near the lower end of space 14 to the channel 36.

The outer enclosure 10 is shown to have generally hemispherical end sections 56, 58. The inlet end section 56 merges into a thickened annular inlet end rim 60. The outlet end section 58 merges into a smaller diameter thickened annular outlet end rim 62. The gas generator 16 comprises a generally cylindrical body 64 having flange structure 66 at its outer end which is boltable to the rim 60, such as by a circular array of bolts 68. The opposite end of body 64 includes annular wall means 70 having an interior cavity which forms the upstream end of the insert chamber. The outlet passageway 18 comprises a tubular body 72 including an upstream end portion 74 with an interior cavity which forms the downstream end portion of the insert chamber. The end portion 74 includes annular wall means for closing the periphery of the channel 36, making it into an annular manifold. Axially extending bolts 76 connect together axial rib portions of the parts 70, 74. An axial gap exists between the parts 70, 74, radially outwardly of the O-ring 34, except at the location of the securement ribs.

The downstream end of tube 72 includes a shoulder 78 which butts against a shoulder 80 formed on the inside of outlet rim 62. A gasket 81 is located between shoulders 80, 82.

Tube 72 also includes an outlet portion 82 which extends through the outlet opening in casing 10. A retaining ring member 84 fits over outlet portion 82 and when seated bears against the outer end surface of rim 62.

As can be readily appreciated, the insert 24 equippped with its various burst discs, O-rings and control orifices is placed between the two section 64, 70, and the bolts 76 are applied so as to secure the sections 64, 70 together. The assembled sections 64, 70 are then slid into the outer housing 10 through the upstream end opening therein. The bolts 68 are applied at the upstream end and the retainer ring 84 is installed at the downstream end. The liquid L is then introduced into the space 14 through a suitable fill opening 83 within member 66 and normally closed by a plug member 85. An excess pressure relief port normally closed by a burst disc 87 may also be provided in member 66.

Preferably, the liquid L is either liquefied ammonia, or aqueous ammonia. Ammonia has a low-boiling point, low viscosity and excellent thermal and chemical stability. Its use makes it possible to use both a small storage space, as its stored liquid volume to generated gas volume ratio is quite large, and a small fuel grain, as its vaporization requires a relatively small amount of heat.

In operation, the fuel grain 20 is initiated by an operator pulling the firing pin to activate the firing mechanism 22. A first portion of hot gases which are generated flows through the ports 30, 32, and when its pressure is sufficient it either pushes aside or breaks the O-ring closure member 34. The hot gases entering the storage chamber 14 perssurize the liquid L therein and force feeds it through the pickup tube 54 towards the annular manifold 36.

The flangible burst disc 48 breaks once the pressure of the hot gases being generated exceeds a predetermined level. Similarly, burst disc 52 breaks when the pressure on its exceeds a predetermined value. After the discs 48, 52 have been broken, the remaining portion of the hot gases flows through the passageway 25 into the outlet section 18. The pressurized liquid L is force fed by the gas pressure acting on its from the manifold 36 through the ports 38 and into mixing contact with the hot gases in passageway 25. The hot gases and liquid enter section 18 and are thoroughly mixed therein before flowing out of the gas generator through the outlet 82 as a gaseous working fluid.

An elongated perforated cylindrical baffle or tube 86, smaller in diameter than tube 72, is coaxially supported within tube 72. Tube 86 includes a closed forward end 88 spaced rearwardly of the outlet from insert 24 and a plurality of side openings or orifices, some of which are designated 90. This construction results in the liquid and hot gas mixture entering section 18 having to flow outwardly into the annular space between tubes 72 and 86, then radially inwardly through the openings 90 into the interior of tube 86, and from such interior outwardly of the gas generator through outlet 82. As will be appreciated, this tortuous flow path results in considerable turbulence within section 18, enhancing the mixing of the liquid and hot gases. A flexible hose 92 stems from the outlet 82 to the inlet I of an inflatable device ID (FIG. 1). In FIG. 1 the inlet I is diagrammatically shown to include an aspirator for amibient air and a check valve CV.

The gas generator shown by FIGS. 1–3 is especially adapted for use in an aircraft escape slide inflation system. In FIG. 1 the gas generator is shown in the attitude it occupies within a space provided for it within the hollow interior of the door with which the escape slide is associated. It is to be noted that when the gas generator is in the attitude shown, with the angle $x$ being approximately fifteen degree (15°), the inlet end of the pickup tube 54 is adjacent the lowermost zone within the chamber 14, and the generated gases are discharged from the lower end of the gas generator.

Figure 4:
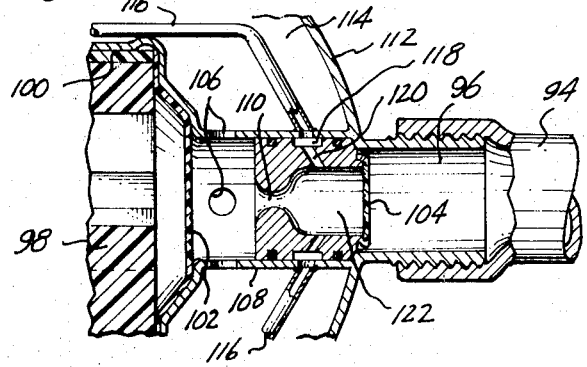
FIG. 4 is a fragmentary longitudinal sectional view of a modified form of gas generator.

FIG. 4 shows a portion of a slightly modified form of cool gas generator. This embodiment is like the embodiment shown in FIG. 2 of my aforementioned U.S. Pat. No. 3,431,742, except for the direction of extent of the conduit 94 which leads from the outlet tube 96 to the utilization device. The embodiment of FIG. 4 is shown to include a fuel grain 98 within a combustion chamber 100. A first pressure burst disc 102 initially closes the outlet of the combustion chamber 100. A second pressure burst disc 104 is located downstream of where mixing first occurs. A plurality of hot gas ports or passageways 106 are located in the side wall of tubular member 108 between the first burst disc 102 and a control orifice 110. An outer housing or casing 112 surrounds the combustion chamber casing 100 and a liquid storage space 114 is defined between the two casings 100, 102. Liquid pickup tubes 116 extend from pickup zones within space 14 to an annular manifold 118. One or more ports 120 extend from the manifold 118 inwardly into the portion of the hot gas passageway 22 which is between the metering orifice 110 and the second burst disc 104. In operation, the gas generator of this embodiment behaves in the same fashion as the gas generator embodiment of FIG. 1–3, except that the outlet passageway 96 is not an enlarged mixing chamber and it does not include mixing baffles.

What is claimed is:
1. An inflation gas generator, comprising:
outer housing means;
smaller inner housing means inside said outer housing means;
with a storage space for a liquid existing about the inner housing means, between it and the outer housing means, and a vaporizable liquid in said space which in part at least is a pressure liquefied gas;
said inner housing means including a hot gas generation chamber and a communicating outlet passageway extending from said chamber to an outlet opening in said outer housing means, said outlet passageway being defined by a tube secured at one end to the hot gas generation chamber and at its opposite end projecting through the outlet opening in the outer housing means;
means in said hot gas generation chamber for generating hot gases therein, for release therefrom into said outlet passageway;
said inner housing means including a hot gas passageway leading from the interior thereof into said storage space, for delivering a portion of the hot gases into said space, and a liquid passageway downstream of said hot gas passageway, leading from said space into said outlet passageway;
pressure releasable closure means in said inner housing means, between said hot gas generation chamber and said liquid passageway, operable to prevent liquid from entering the hot gas generation chamber while the generator is inactive but releasably by the pressure of generated hot gases to permit outflow of the hot gases from said chamber into and through the outlet passageway, with some of said hot gases flowing through said hot gas passageway into the space to pressurize said liquid and pressure feed it as a liquid through the liquid passageway into the outlet passageway, for mixture therein with the hot gases, and with the hot gases in such mixture serving to vaporize the liquid to form a relatively cool gaseous fluid; and
a flexible hose conduit connected with said tube adjacent said outlet opening and leading therefrom to an inflatable object.

2. A cool gas generator according to claim 1, wherein said inner and outer housing means are both elongated and are at least generally coaxially related, wherein said liquid passageway enters the inner housing intermediate the length thereof, generally at the junction of the hot gas generation chamber with the outlet passageway, wherein in use said cool gas generator is tilted at an angle placing its longitudinal axis between vertical and horizontal, and wherein a liquid delivery tube is located within said storage space, and said tube extends from a liquid pickup station adjacent the low end of said storage space to a connection with said liquid passageway.

3. A cool gas generator according to claim 1 wherein the outlet opening is at the lower end of said tilted cool gas generator.

4. A cool gas generator, comprising:
outer housing means;
smaller inner housing means inside said outer housing means;
with a storage space for a liquid existing about the inner housing means, between it and the outer housing means, and a vaporizable liquid in said space;
said inner housing means including a hot gas generation chamber and a communicating outlet passageway extending from said chamber to an outlet opening in said outer housing means, said outlet passageway being defined by an elongated tube secured at one end to the hot gas generation chamber and at its opposite end communicating with said conduit means generally at the outlet opening in said outer housing means;
means in said hot gas generation chamber for generating hot gases therein, for release therefrom into said outlet passageway tube;
said inner housing means including a hot gas passageway leading from the interior thereof into said storage space, for delivering a portion of the hot gases into said space, and a liquid passageway downstream of said hot gas passageway, leading from said space into said outlet passageway;
pressure releasable closure means in said inner housing means, between said hot gas generation chamber and said liquid passageway, operable to prevent liquid from entering the hot gas generation chamber while the generator is inactive but releasable by the pressure of generated hot gases to permit outflow of the hot gases from said chamber into and through the outlet passageway, with some of said hot gases flowing through said hot gas passageway into the space to pressurize said liquid and pressure feed it as a liquid through the liquid passageway into the outlet passageway, for mixture therein with the hot gases, and with the hot gases in such mixture serving to vaporize the liquid to form a relatively cool gaseous fluid;
baffle means in said outlet passageway tube to promote mixing of the hot gases and liquid; and
conduit means leading from said outlet passageway to a utilization device.

5. A cool gas generator according to claim 4, wherein said baffle means comprises an elongated perforated tube coaxially mounted within said outlet passageway tube, said perforated tube being smaller in diameter than said outlet passageway tube so that an annular space is defined between the two tubes, with the upstream end of said perforated tube being spaced downstream of the discharge location of the liquid passageway, with said upstream end being at least partially closed so that the hot gas and liquid entering the outlet passageway tube are directed into the annular space surrounding said perforated tube, and with blockage wall means extending radially between said tubes at the downstream end of said annular space, and at least partially closing said space, so that the fluid mixture is made to flow radially inwardly from said space, through the perforations, and into the perforated tube, and from said perforated tube into said conduit means, with the tortous path so created serving to enhance mixing of the fluids and promote complete vaporization of the liquid.

6. A cool gas generator, comprising:
outer housing means;
smaller inner housing means inside said outer housing means;
with a storage space for a liquid existing about the inner housing means, between it and the outer housing means, and a vaporizable liquid in said space;
said inner housing means including a hot gas generation chamber and a communicating outlet passageway extending from said chamber to an outlet opening in said outer housing means, said outlet passageway being defined by an elongated tube secured at one end to the hot gas generation chamber and at its opposite end projecting through the outlet opening in the outer housing means and extending outwardly beyond said opening, and wherein the extending portion is externally threaded and a securement nut threadably engages said threaded portion;
means in said hot gas generation chamber for generating hot gases therein, for release therefrom into said outlet passageway;
said inner housing means including a hot gas passageway leading from the interior thereof into said storage space, for delivering a portion of the hot gases into said space, and a liquid passageway downstream of said hot gas passageway, leading from said space into said outlet passageway;
pressure releasable closure means in said inner housing means, between said hot gas generation chamber and said liquid passageway, operable to prevent liquid from entering the hot gas generation chamber while the generator is inactive but releasable by the pressure of generated hot gases to permit outflow of the hot gases from said chamber into and through the outlet passageway, with some of said hot gases flowing through said hot gas passageway into the space to pressurize said liquid and pressure feed it as a liquid through the liquid passageway into the outlet passageway, for mixture therein with the hot gases, and with the hot gases in such mixture serving to vaporize the liquid to form a relatively cool gaseous fluid; and conduit means leading from said outlet passageway to a utilization device.

7. A cool gas generator comprising:

outer housing means;

smaller inner housing means inside said outer housing means;

with a storage space for a liquid existing about the inner housing means, between it and the outer housing means, and a vaporizable liquid in said space;

said inner housing means including a hot gas generation chamber and a communicating outlet passageway extending from said chamber to an outlet opening in said outer housing means;

means in said hot gas generation chamber for generating hot gases therein, for release therefrom into said outlet passageway;

said inner housing means including a hot gas passageway leading from the interior thereof into said storage space, for delivering a portion of the hot gases into said space, and a liquid passageway downstream of said hot gas passageway, leading from said space into said outlet passageway;

pressure releasable closure means in said inner housing means, between said hot gas generation chamber and said liquid passageway, operable to prevent liquid from entering the hot gas generation chamber while the generator is inactive but releasable by the pressure of generated hot gases to permit outflow of the hot gases from said chamber into and through the outlet passageway, with some of said hot gases flowing through said hot gas passageway into the space to pressurize said liquid and pressure feed it as a liquid through the liquid passageway into the outlet passageway, for mixture therein with the hot gases, and with the hot gases in such mixture serving to vaporize the liquid to form a relatively cool gaseous fluid;

a replaceable control insert in said inner housing means between said hot gas generation chamber and said outlet passageway, said insert comprising a control orifice for hot gases flowing from the hot gas generation chamber into said outlet passageway and at least a portion of said hit gas passageway, in parallel with said control orifice, and wall means forming a socket for receiving said control insert; and conduit means leading from said outlet passageway to a utilization device.

8. A cool gas generator according to claim 7, comprising a pressure releasable closure member for said hot gas passageway.

9. A cool gas generator according to claim 7, comprising seal elements between said insert and said side wall means on each side of said hot gas passageway.

10. The method of rapidly inflating a gas confining type inflatable object, comprising:

delivering liquid at least in part comprising pressure liquefied ammonia, as a liquid, into a flow-through type mixing zone;

delivering hot gases into said mixing zone, for mixing with said liquid, so that as the fluids are flowing the hot gases will vaporize the liquid and provide a gaseous effluent therefrom;

introducing the gaseous effluent into a gas confining type inflatable;

proportioning the hot gases and the liquid so that the gaseous mixture in the inflatable object is approximately at ambient temperature.

11. The method of claim 10, wherein said liquid is a mixture of water and liquefied ammonia.

12. The method of claim 10, further comprising controlling the delivery rates of the liquid and the hot gases so that there is no appreciable drop of inflation gas pressure throughout the period of gas introduction into the inflatable object.

13. The method of claim 10, further comprising forming the generated gases into a stream and entraining ambient air into the stream, and introducing the combined fluids into the inflatable object.

14. A method of rapidly inflating a gas confining type inflatable object, comprising:

introducing a flowing liquid into a flow-through type mixing zone, said liquid at least in part comprises liquefied ammonia;

introducing hot gases into the mixing zone into direct mixing contact with said liquid;

controlling the flowing rates of the flowing fluids so that the hot gases will provide the heat of vaporization for, and cause vaporization of, at least most of the liquid, to form a working fluid;

forming said fluid into a stream and entraining ambient air into said stream; and delivering the resulting mixture into a gas confining type inflatable.

15. The method of rapidly vaporizing liquid to produce a gaseous working fluid, comprising:

generating hot gases under pressure by burning a solid fuel grain in a first confined zone;

delivering a liquid that at least partially comprises pressure liquefied ammonia from a second zone, constituting a pressure vessel type storage chamber, into a third confined zone, constituting a flow-through mixing zone;

delivering a first portion of said hot gases from said first confined zone directly into said third confined zone, for flow-through type mixing therein with said liquid; and delivering a second portion of said hot gases into said pressure vessel, and using it to pressure feed the liquid, as a liquid, from said vessel to said mixing zone.

16. The method of claim 15, further comprising forming the effluent of the mixing zone into a stream and entraining ambient air into such stream.

References Cited

UNITED STATES PATENTS

| 3,340,691 | 9/1967 | Mangum | 60—39.48 |
| 3,431,742 | 3/1969 | Green | 62—52 |

MEYER PERLIN, Primary Examiner

U.S. Cl. X.R.

62—52; 60—39.48